US011275392B2

(12) United States Patent
Cowles et al.

(10) Patent No.: US 11,275,392 B2
(45) Date of Patent: Mar. 15, 2022

(54) GAS PRESSURE REGULATOR

(71) Applicant: Linde Aktiengesellschaft, Munich (DE)

(72) Inventors: Christopher Cowles, London (GB); Duncan Wales, Peterborough (GB)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 16/300,131

(22) PCT Filed: May 5, 2017

(86) PCT No.: PCT/EP2017/060817
§ 371 (c)(1),
(2) Date: Nov. 9, 2018

(87) PCT Pub. No.: WO2017/194423
PCT Pub. Date: Nov. 16, 2017

(65) Prior Publication Data
US 2019/0146528 A1 May 16, 2019

(30) Foreign Application Priority Data
May 10, 2016 (GB) ..................... 1608147

(51) Int. Cl.
*G05D 16/10* (2006.01)
*F17C 9/00* (2006.01)
(Continued)

(52) U.S. Cl.
CPC ............. *G05D 16/10* (2013.01); *F16K 31/60* (2013.01); *F16K 31/602* (2013.01);
(Continued)

(58) Field of Classification Search
CPC ........... G05D 16/0669; G05D 16/0636; G05D 16/0661; G05D 16/10; G05D 16/107;
(Continued)

(56) References Cited

U.S. PATENT DOCUMENTS 1,462,466 A * 7/1923 Whitaker
2,739,611 A * 3/1956 Cornelius ............. F16K 17/168
137/505.15
(Continued)

FOREIGN PATENT DOCUMENTS

JP 2011043196 A * 3/2011 ............... F16K 1/04

*Primary Examiner* — Atif H Chaudry
(74) *Attorney, Agent, or Firm* — Millen White Zelano & Branigan, PC; Brion P. Heaney

(57) ABSTRACT

A gas pressure regulator comprises a high pressure inlet and a regulator mechanism which is arranged to receive high pressure gas via the high pressure inlet, and deliver gas at a regulated pressure to a regulated pressure outlet. The regulator comprises a regulator element and a rotatable member that rotates to move the regulator element, thereby adjusting the regulated pressure. A gauge arranged to receive high pressure gas and display a measured reading of the pressure of the high pressure gas is also provided along with a regulated pressure indicator which is arranged to display a regulated pressure value related to the degree of rotation of the rotary mechanism. The regulator mechanism has a gear chain between the rotatable member and the indicator so that it requires multiple rotations of the rotatable member to move the regulator element through its full range of movement.

7 Claims, 3 Drawing Sheets

(51) Int. Cl.
*F16K 37/00* (2006.01)
*F17C 7/00* (2006.01)
*F17C 13/02* (2006.01)
*F16K 31/60* (2006.01)

(52) U.S. Cl.
CPC ...... *F16K 37/0008* (2013.01); *F16K 37/0016* (2013.01); *F17C 7/00* (2013.01); *F17C 9/00* (2013.01); *F17C 13/025* (2013.01); *G05D 16/107* (2019.01); *F17C 2205/0335* (2013.01); *F17C 2205/0338* (2013.01); *F17C 2205/0394* (2013.01); *Y10T 137/7793* (2015.04); *Y10T 137/8225* (2015.04); *Y10T 137/8275* (2015.04); *Y10T 137/8292* (2015.04); *Y10T 137/8309* (2015.04)

(58) Field of Classification Search
CPC ......... Y10T 137/7793; Y10T 137/8225; Y10T 137/8275; Y10T 137/8292; Y10T 137/8309; F16K 37/0008; F16K 37/0016; F16K 31/60; F16K 31/602; F17C 2205/0338; F17C 2205/0329; F17C 2250/043; F17C 2205/0382; F17C 2205/0385; F17C 2250/0626; F17C 2205/0394

See application file for complete search history.

(56) References Cited

U.S. PATENT DOCUMENTS 3,547,143 A * 12/1970 Mills
4,541,454 A *  9/1985 Sturman et al.
5,082,019 A *  9/1992 Tetrault
6,062,258 A *  5/2000 Diehl

* cited by examiner

GAS PRESSURE REGULATOR

BACKGROUND OF THE INVENTION

The present invention relates to a gas pressure regulator.

Such regulators are commonly used in conjunction with a pressurised cylinder of gas. Traditionally, such gas regulators are in the form of a detachable unit that is connected downstream of the shut-off valve of the gas cylinder. However, they can also be integrated into the cylinder valve in what is known as a valve with integrated pressure regulator (VIPR).

Such regulators commonly have two gauges, a high pressure gauge to measure and display the pressure of the gas in the cylinder which is supplied to a high pressure inlet of the regulator and a regulated pressure gauge to measure and display the regulated pressure at the regulator outlet. In use, a user opens the shut-off valve of the cylinder and then adjusts the regulator until the regulator gauge has shown the desired regulated pressure.

Such a design suffers from a number of drawbacks.

The gauges are always susceptible to damage as the cylinders are vulnerable to being knocked during transportation and use. Because the regulated pressure gauge is measuring a lower pressure, the components in this gauge are more delicate. As a result, the gauge is more expensive to manufacture and also more vulnerable to damage. Also, because the regulated pressure cannot be displayed until after the cylinder outlet valve is open, some gas from the cylinder is not at the desired regulated pressure as the user sets the regulated pressure after the outlet valve is opened.

BRIEF SUMMARY OF THE INVENTION

The present invention is aimed at providing an improved gas pressure regulator.

According to the present invention there is provided a gas pressure regulator having: a high pressure inlet and a regulated pressure outlet; a regulator mechanism arranged to receive high pressure gas through the high pressure inlet and to deliver gas through the regulated pressure outlet, the regulator mechanism comprising a regulator element and a wheel that moves the regulator element; and a regulated pressure indicator arranged to display a regulated pressure value related to the degree of rotation of a rotary mechanism; wherein the rotary mechanism comprises a gear mechanism between the wheel and the regulated pressure indicator such that more than one full rotation of the wheel is required to move the regulator element through its full range of movement.

Such a regulator eliminates the need for a gauge that measures and displays the regulated pressure. This eliminates significant expense and also eliminates the component most vulnerable to damage. Instead, rather than measuring the regulated pressure, the regulated pressure is displayed based on the degree of opening of the rotary mechanism that moves the regulator element.

The regulated pressure indicator can be calibrated by knowing the high pressure in the cylinder, a known regulated pressure and the degree of opening of the rotary mechanism required to move the regulator element through its full range of movement.

Another benefit with this arrangement is that the user has visibility of the regulated pressure before they need to open the outlet valve of the cylinder such they can immediately be confident that the gas from the cylinder is being delivered at the pre-set regulated pressure.

It is normally the case that the hand wheel which operates the regulator is turned though a number of complete rotations to provide the full range of movement of the regulator. By providing a gear mechanism, this requirement for a number of full turns can be preserved while ensuring that the regulated pressure indicator can display the full range of regulated pressures in a single rotation or less of the indicator.

The regulator may be a unit which is connectable to a cylinder with a cylinder outlet valve. However, preferably, the regulator is integrated into a housing containing the cylinder outlet valve.

The invention also extends to a cylinder of high pressure gas to which the gas pressure regulator is attached.

BRIEF DESCRIPTION OF THE SEVERAL VIEWS OF THE DRAWINGS

Examples of a gas pressure regulator in accordance with the present invention will now be described with reference to the accompanying drawings, in which.

DETAILED DESCRIPTION OF THE INVENTION

Figure 1:
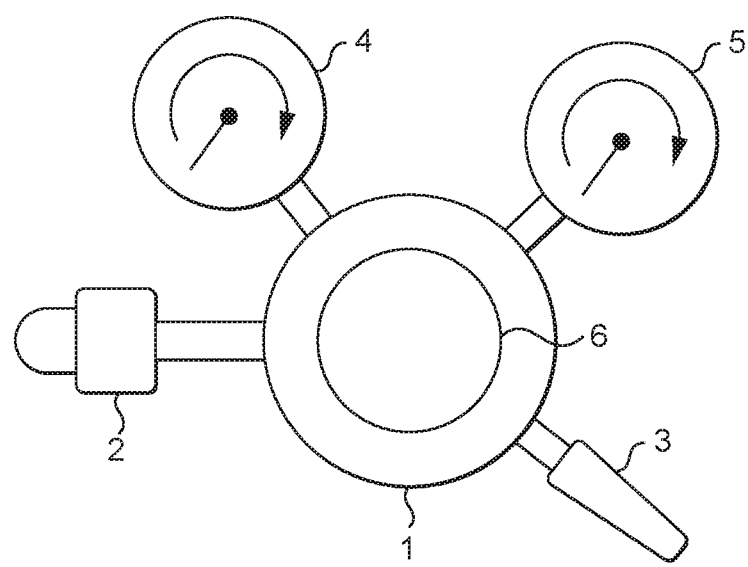
FIG. 1 is a schematic top view of a prior art regulator.

FIG. 1 is a schematic view of a typical type of detachable pressure regulator. This has a regulator mechanism 1 which receives high pressure gas from a high pressure gas inlet 2 which is attached to a high pressure gas cylinder. Gas at the regulated pressure is then emitted through the regulated pressure outlet 3. The high pressure gauge 4 is in communication with the high pressure gas source. The high pressure gas impinges on a pressure sensitive member which moves a needle on the dial. Similarly, the regulated pressure gauge 5 is in communication with gas at the regulated pressure. A hand wheel 6 is provided which is rotatable by a user to set the level of regulated pressure. The user will turn this dial until the regulated pressure gauge 5 displays their target regulated pressure.

Figure 2:
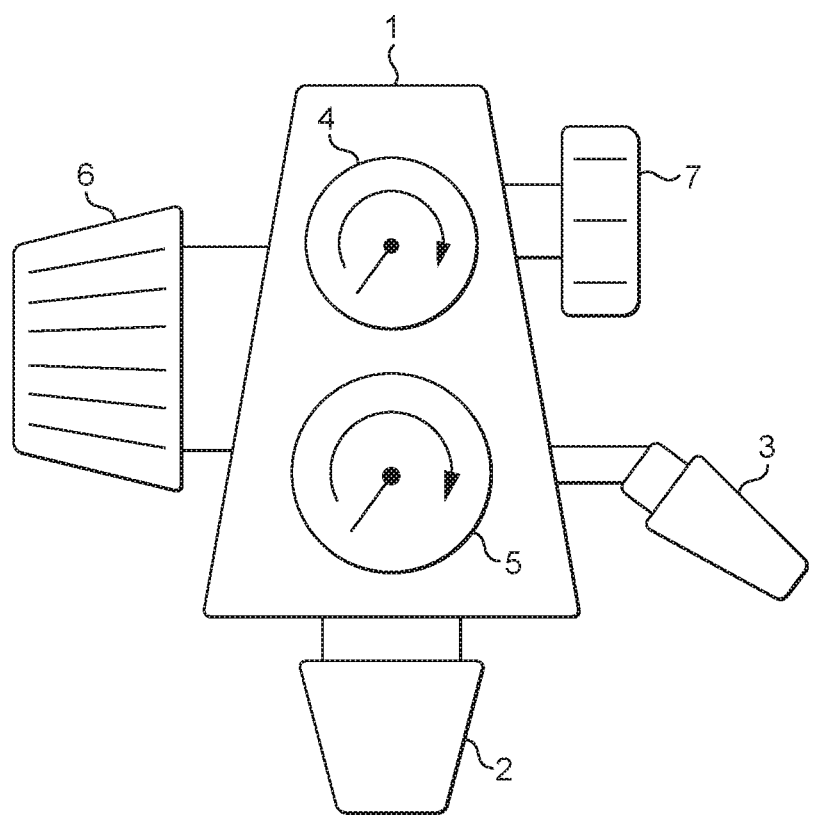
FIG. 2 is a schematic side view of a prior art valve with integrated pressure regulator.

FIG. 2 shows a further known design. This has a cylinder valve with integrated pressure regulator (VIPR). This arrangement includes both the regulator as previously described as well as the shut off valve for the cylinder. The same components are identified by the same reference numerals as in FIG. 1. The main difference between FIGS. 1 and 2 is the presence of a valve shut-off mechanism 7 which is in the form of a hand wheel which will operate the cylinder outlet valve.

Figure 3:
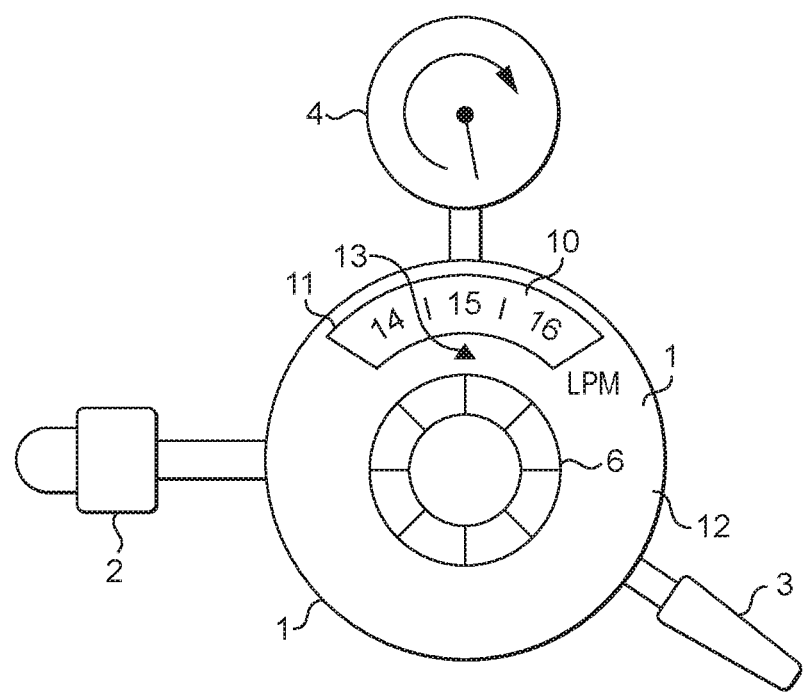
FIG. 3 is a schematic view of a regulator similar to FIG. 1 but in accordance with the present invention.
Figure 4:
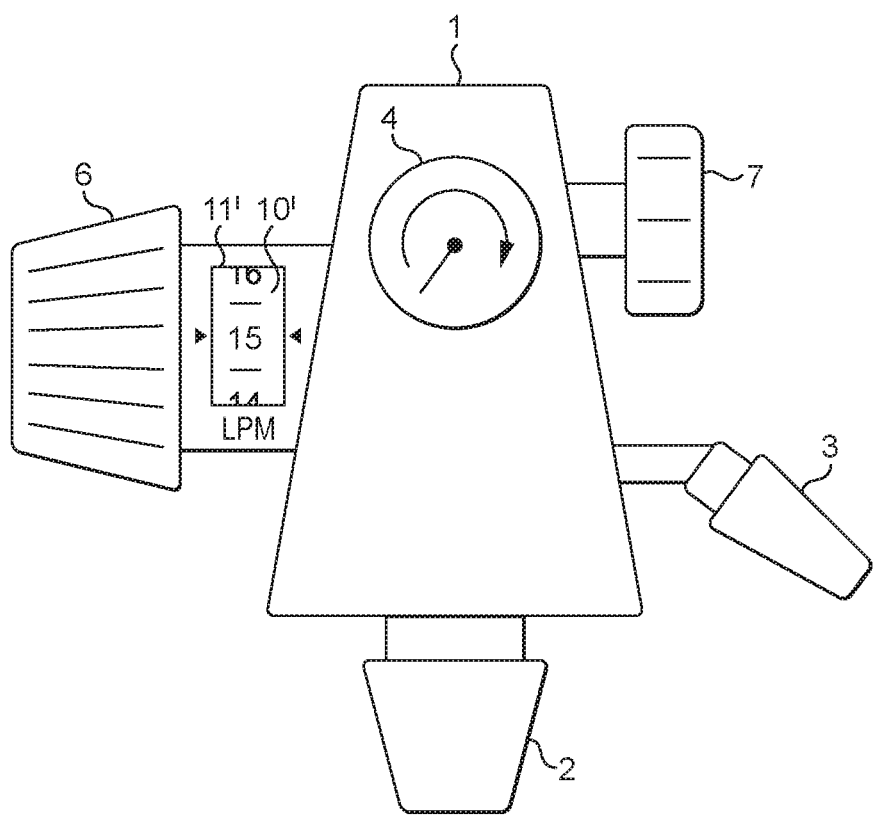
FIG. 4 is a schematic view of an integrated pressure regulator similar to FIG. 2 but in accordance with the present invention.

FIGS. 3 and 4 show regulators which correspond to FIGS. 1 and 2 respectively in which the regulated pressure gauge 5 has been replaced with the regulated pressure indicator according to the present invention. In the drawings, the same components have been designated with the same reference numerals.

In FIG. 3 the hand wheel 6 is connected (via a gearing mechanism described below) to a scale 10 visible through a window 11 in a cap 12 of the regulator 1. As the hand wheel 6 is turned, the scale is correspondingly turned in order to bring a different number into alignment with an indicator in the form of an arrow 13 on the cap 12.

In FIG. 4 a similar scale 10' and window 11' are used such that the scale 10' is again turned by the hand wheel 6.

In order to set the regulated pressure, the user can rotate the hand wheel 6 to set the desired pressure on the scale. This can be done before the cylinder outlet valve is open to ensure that the regulator will immediately begin emitting the desired regulated pressure.

Figure 5:
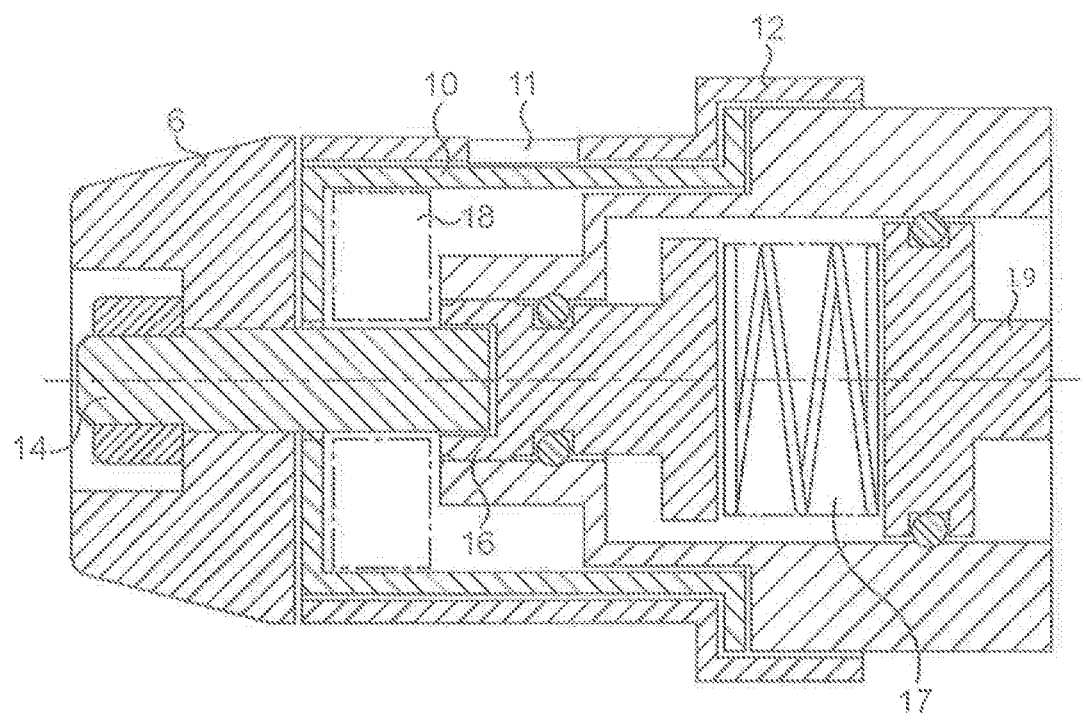
FIG. 5 is a cross-sectional view showing the pressure regulator and gearing mechanism in greater detail.

The manner in which the hand wheel 6 is linked to the scale 10 and the regulator element will now be described with reference to FIG. 5. This shows the hand wheel 6 connected to a regulator stem 14 which is connected to a regulator spindle 16. The regulator spindle 16 bears against the regulator spring 17 to adjust the pressure on the regulator piston 19 thereby setting the regulated pressure. The stem 14 is also connected via a gear box 18 to the scale 10. The regulator cap 12 is provided with the window 11 as previously described, which remains in a stationary position while the hand wheel is being rotated. Numbering, or other indicia are provided on the scale 10, for example by printing such that the is progressively viewable through the window 11.

A single turn of the hand wheel 6 will move the regulator spindle 16 through a proportion of its total linear movement. The gearbox 18 is configured to rotate the scale 10 through the same (or a smaller) proportion of its full rotation. Thus, if the regulator spindle 16 can be moved across its full range of movement by three turns of the hand wheel 6, the gearbox 18 is designed so that the scale 10 will rotate through almost one complete rotation in the same three rotations of the hand wheel 6. Of course, there is no need for the scale 10 to go through a full rotation in order to display the full range of regulated pressures. However, the closer to a full rotation it travels, the larger the scale can be. The regulator could be designed to go through its full range of movement in more or less than the three rotations described above.

The invention claimed is:

1. A gas pressure regulator comprising:
   a high pressure inlet and a regulated pressure outlet;
   a regulator mechanism arranged to receive high pressure gas via the high pressure inlet and to deliver gas through the regulated pressure outlet, the regulator mechanism comprising a regulator element and a hand wheel which is rotatable by a user that moves the regulator element; and
   a regulated pressure indicator arranged to display a regulated pressure value related to the degree of rotation of a rotary mechanism;
   wherein the rotary mechanism comprises a gear mechanism between the hand wheel and the regulated pressure indicator such that more than one full rotation of the hand wheel is required to move the regulator element through its full range of movement,
   wherein the regulator element comprises a regulator stem, regulator spindle, a regulator spring, and a regulator piston, the regulator stem having a first end and a second end, and wherein the regulator stem is connected to the rotary mechanism,
   wherein the first end of the regulator stem is connected to the hand wheel and the second end of the regulator stem is connected to the regulator spindle, and the regulator spindle bears against the regulator spring to adjust the pressure on the regulator piston and thereby set the regulated pressure, and
   wherein the regulator spindle has a first end and a second end, the first end of the regulator spindle has a first end face having a cavity in which the second end of the regulator stem is inserted, the second end of the of the regulator spindle has a second end face which bears against the regulator spring to adjust the pressure on the regulator piston and thereby set the regulated pressure.

2. The gas pressure regulator according to claim 1, further comprising a gauge arranged to receive high pressure gas and to display a measured reading of the pressure of the high pressure gas.

3. The gas pressure regulator according to claim 2, wherein the high pressure inlet is connected to a cylinder with a cylinder shut-off valve.

4. The gas pressure regulator according to claim 3, wherein the gas pressure regulator is integrated into a housing containing the cylinder shut-off valve.

5. The gas pressure regulator according to claim 1, wherein the high pressure inlet is connected to a cylinder with a cylinder shut-off valve.

6. The gas pressure regulator according to claim 5, wherein the gas pressure regulator is integrated into a housing containing the cylinder shut-off valve.

7. The gas pressure regulator according to claim 1, wherein said regulator has a cap which is provided with a window through which a scale is visible, and wherein said scale is connected to said regulator stem via a gear box whereby, as the hand wheel is turned, the scale is correspondingly turned such that a user can turn the hand wheel to a desired regulated pressure indicated by the scale.

* * * * *